Jan. 7, 1969   J. P. ETTINGER   3,421,070
ON-OFF CONTROL OF SCR REGULATED POWER SUPPLY
Filed March 7, 1967   Sheet 1 of 2

INVENTOR
JAMES P. ETTINGER
BY
*James* *Franklin*
ATTORNEY

United States Patent Office 3,421,070
Patented Jan. 7, 1969

3,421,070
ON-OFF CONTROL OF SCR REGULATED POWER SUPPLY
James P. Ettinger, Ridgefield, Conn., assignor to Electric Regulator Corporation, Norwalk, Conn., a corporation of New York
Filed Mar. 7, 1967, Ser. No. 621,271
U.S. Cl. 321—11      12 Claims
Int. Cl. H02m 1/18

ABSTRACT OF THE DISCLOSURE

In a power supply utilizing controlled rectifiers, means are provided for opening and closing an output switch in proper timed relation with overriding control of the regulation circuit so that the output switch is always opened and closed when the output is in a reduced, and preferably zero, status.

---

Figure 1:
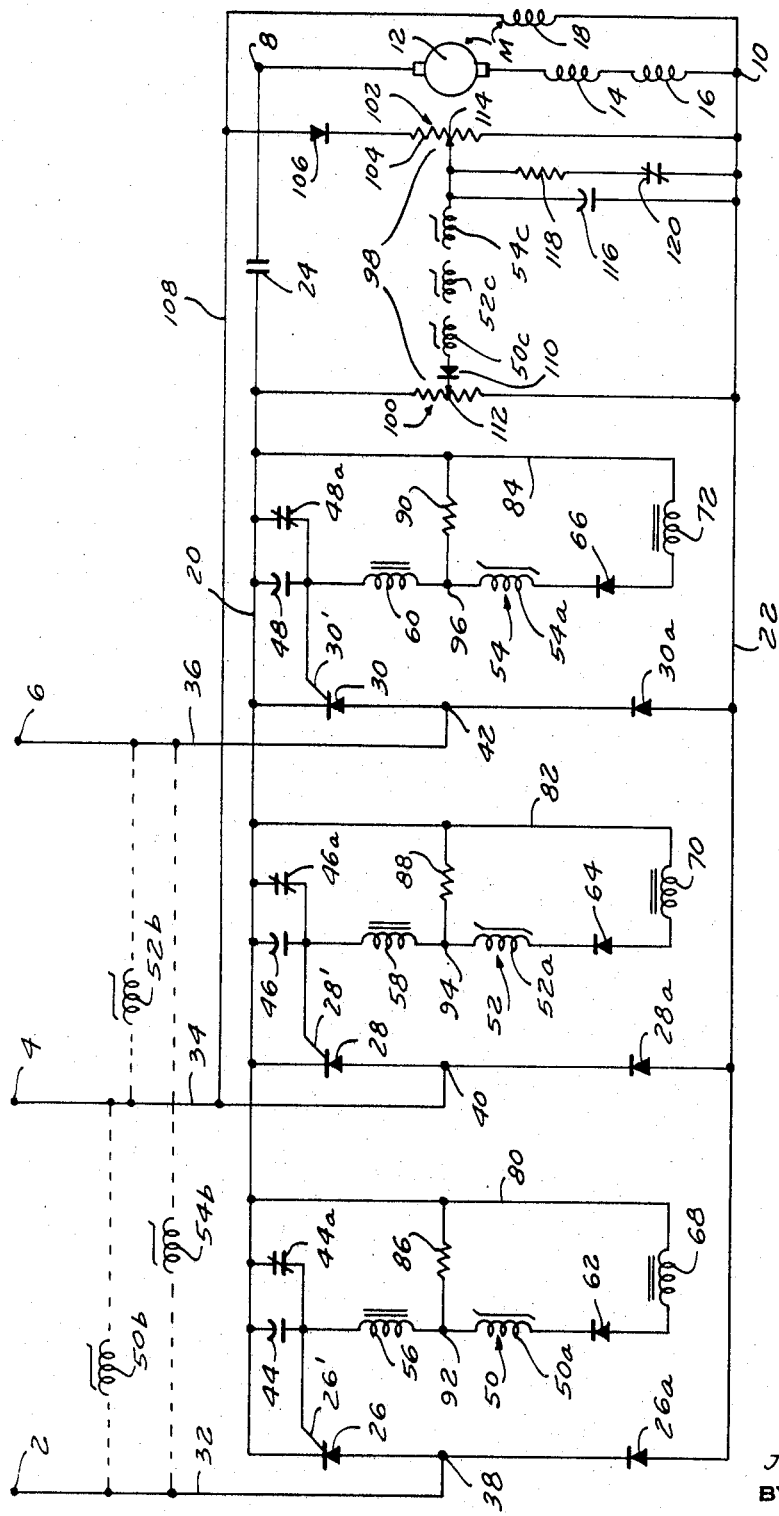

The present invention relates to means for coordinating the opening and closing of a power output switch with the actuation of a voltage regulating circuit so that the output switch carries minimum current whenever it is opened or closed.

If a switch is opened while it is carrying current, the current will tend to continue to flow, and arcing between the switch contacts will occur, that arcing causing deterioration of the contacts. The same situation, but to a somewhat lesser extent, occurs when contacts are closed while a large voltage difference exists between them; an arc tends to jump from one to the other before they attain a fully closed position. Thus output switches in power supply circuits are relatively short-lived unless they are exceedingly sturdy and costly, and even then their effective life is not optimum.

One type of power supply in widespread use, particularly for conversion of an AC input to a DC output, involves the use of controlled rectifiers, today generally of the semiconductor type. Means are provided for controlling the time duration of the periods of conductivity and nonconductivity of the controlled rectifiers in such power supplies in order to vary the output thereof, usually with a view to maintaining one or more of the output parameters such as voltage at a predetermined value. These controlled rectifiers, like other diodes, have an anode and cathode and conduct only in one direction; they also have a control electrode. The characteristic of such devices is that they will only conduct in the direction in which they are poled when two conditions simultaneously obtain, to wit, proper forwarding biasing of the anode and cathode and proper energization of the control electrode. Once these devices start to conduct, the control electrode becomes inoperative—conduction will continue, whether or not the control electrode is energized, for as long as the proper forward bias on cathode and anode is provided.

It has been appreciated that it is desirable to open and close the output switch only when the output is at a reduced value, and preferably at zero, thereby to positively prevent deterioration of the output switch contacts. However, such systems as have in the past been designed to accomplish this result have been characterized by complexity, expense, and lack of reliability. Moreover, when the operation of controlled rectifiers form the basis for circuit regulation, special problems are presented insofar as the proper opening and closing of the output switch is concerned, which have militated against the use of systems for properly timing the opening and closing of the output switch, and which have also militated against the use of such power supplies in conjunction with loads of a highly variable character.

Because controlled rectifiers will turn on, when proper anode-cathode bias is provided, when their control electrodes are only instantaneously energized and will thereafter remain on, they are particularly sensitive to being rendered conductive at undesired times by means of voltage spikes or transients applied to their control electrodes. Moreover, semiconductor type controlled rectifiers have a limited degree of current-carrying capacity, and if that capacity is exceeded the devices will be destroyed. It therefore is essential in a system utilizing such cotnrolled rectifiers that the coordination between the control of the rectifiers and the closing and opening of the output switch be accurately and positively attained. It is, moreover, extremely important, when the load fed by the power supply is highly variable in character, that the rectifiers not be rendered unrestrictedly conductive until an appreciable load does exist across the output of the power supply, for otherwise the current through those rectifiers would rapidly become so great as to destroy them. For example, when the load is constituted by a DC motor at standstill constitutes virtually a short circuit across the output of the power supply. It is only as the motor comes up to speed that it constitutes a load large enough to keep the current through the rectifiers at a safe value. Means must therefore be provided for preventing unrestricted conduction of the controlled rectifiers, after the output switch has been closed, until the DC motor or other highly variable load has attained a condition such as to protect the rectifier in question.

It is the prime object of the present invention to devise a simple system which accomplishes the above results, and which does so in a rapid and reliable manner. To this end first means are provided for actuating the output switch between open and closed positions, second means are provided for actuating the regulation system of the power supply between full output and reduced output conditions (the reduced output condition preferably being a zero output condition), and an interlock is provided between the two means which is effective, upon actuation of an on-off control, to ensure that the regulation means is actuated to its reduced output condition before the output switch is opened and to ensure that the output switch is closed before the regulation means is actuated from its reduced output condition to its full output condition. Further, the actuation of the regulation means involves two different actions, one in effect reducing the value of the regulated output parameter such as voltage and the other positively conditioning the controlled rectifiers into a nonconductive condition, those actions preferably occurring in the recited sequence when the system is turned off and reversing in the opposite sequence when the system is turned on, thereby both preventing the controlled rectifiers from being turned on by voltage spikes or transients and preventing them from being turned on unrestrictedly the moment that the output switch is closed.

The timing arrangement which produces these results is electromagnetic in nature, and preferably comprises an electromagnet unit having an armature the motion of which is damped or delayed and which, in its movement, sequentially opens and closes a series of contact pairs. One such unit particularly well adapted for use in conjunction with the present invention is that which is sold by the assignee of the instant invention under the trademark "Regohm" and a typical version of which is disclosed in Cohen Patent 2,650,957 of Sept. 1, 1953, entitled "Finger Type Circuit Regulator and Contact Assembly Therefor." The contact pairs of this electromagnetically actuated device are electrically connected to appropriate points in the regulation circuit of the power supply system. The on-off control means is operatively connected to the actuating coil of this electromagnetic device and is also operatively connected to the actuating means, preferably also electromagnetic in character, for the output switch. When, as is generally the case in connection with electric motor controls, the on-off control means comprises a normally open start switch and a normally closed stop switch, the two switches are so connected in the circuit that positive sequential action is ensured.

Figure 2:
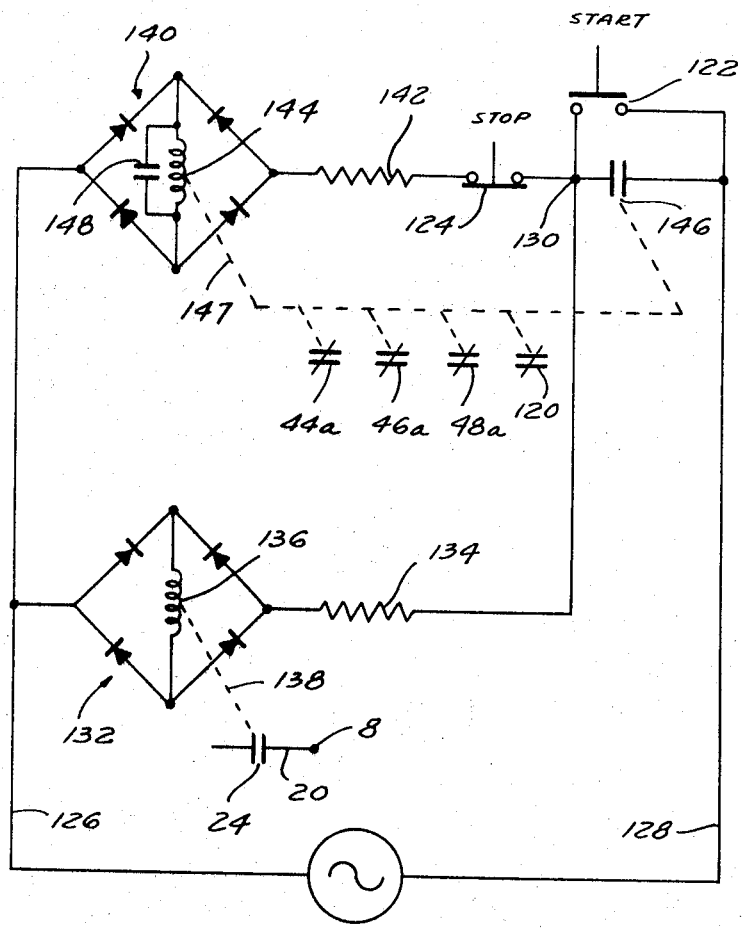

To the accomplishment of the above, and to such other objects as may hereinafter appear, the present invention relates to a power supply and output switch control system as defined in the appended claims and as described in this specification, taken together with the accompanying drawings, in which:

FIG. 1 is a circuit diagram of a preferred embodiment of the present invention utilizing silicon controlled rectifiers to provide a regulated DC output from an AC input and to drive a DC motor therefrom; and FIG. 2 is a circuit diagram of the on-off control switch and its associated circuit elements, including the electromagnetic means which control the contacts and switches in the circuit of FIG. 1.

The power supply embodiment of the present invention as here disclosed converts a three-phase alternating current input applied at terminals 2, 4 and 6 into a DC output applied at terminals 8 and 10. The load for the power supply as here disclosed comprises a DC motor generally designated M having an armature 12, a commutating field 14 and a stabilizing field 16 connected in series with one another across the output terminals 8 and 10 and also having an appropriately energized shunt field 18. As is well known, the load defined by the armature 12 and the fields 14 and 16 is virtually a short circuit when the armature 12 is stationary but becomes increasingly greater as the armature 12 comes up to speed.

The power supply and regulation system has lines 20 and 22 connected to the terminals 8 and 10 respectively, an on-off switch 24 being interposed in the line 20 adjacent the output terminal 8. Connected between the lines 20 and 22 are three pairs of series connected rectifiers 26 and 26A, 28 and 28A and 30 and 30A respectively, the rectifiers 26, 28 and 30 being controlled rectifiers having control electrodes 26', 28' and 30' respectively, while the rectifiers 26A, 28A and 30A are conventional diodes. Lines 32, 34 and 36 extend from the input terminals 2, 4 and 6 respectively to points 38, 40 and 42 respectively between the rectifiers 26 and 26A, 28 and 28A and 30 and 30A respectively. The rectifier control electrodes 26', 28' and 30' are connected to the line 20 via capacitors 44, 46 and 48 respectively. Switches 44A, 46A and 48A, defined by normally closed but openable contacts, are connected across the capacitors 44, 46 and 48 respectively. The control of the control electrodes 26', 28' and 30' is accomplished by magnetic amplifiers generally designated 50, 52 and 54. The magnetic amplifier 50 comprises an output winding 50a, a firing winding 50b and a control winding 50c, the magnetic amplifiers 52 and 54 being similarly constituted, with similar reference numerals identifying the individual windings. The output windings 50a–54a are connected at one end to their respective control electrodes 26'–30' via choke coils 56, 58 and 60 respectively, and they are connected at their other ends via rectifiers 62, 64 and 66 respectively and choke coils 68, 70 and 72 respectively and leads 80, 82 and 84 respectively to the line 20, with resistors 86, 88 and 90 being connected respectively between the lines 80–84 and points 92, 94 and 96 respectively located between the choke coils 56–60 and the magnetic amplifier windings 50a–54a. The firing windings 50b–54b, designed to synchronize the conductive energization of the control electrodes 26'–30' with the three phases of input current at the input terminals 2, 4 and 6, respectively, may be connected respectively between the lines 32 and 34, 34 and 36, and 36 and 32.

The control windings 50c–54c are designed to be energized, during normal operation of the system, in accordance with the output voltage and to control the duration (initiation) of the conductive periods of the controlled rectifiers 26–30 in order to maintain the output voltage at a predetermined value. The circuitry for accomplishing this is generally designated 98, and comprises an output voltage sensing circuit 100 defined by a resistor connected across the lines 20 and 22, and a reference voltage circuit 102 comprising resistor 104 and rectifier 106 connected in series between lines 22 and line 108 connected to AC line 34. The line 108 also serves to energize the shunt winding 18 of the motor M. The output voltage and the reference voltage are compared by a circuit comprising the control windings 50c–54c connected in series with rectifier 110 between fixed point 112 on the voltage sensing circuit 100 and adjustable point 114 on the reference voltage deriving resistor 104. The amount of current which flows through the control windings 50c–54c will be a function of the difference between the voltages at the points 112 and 114. A capacitor 116 and a resistor 118 are connected in parallel with one another between point 114 and the line 22, and a switch 120 comprising a normally closed but openable pair of contacts is provided in series with the resistance 118. The size of the capacitor is such as to cause the voltage at 114 to take an appreciable time (perhaps as much as two minutes or so) to build up after the switch 120 shifts from closed to open condition.

Turning now to FIG. 2, the on-off control, which may be manually, automatically or semiautomatically actuated, is here illustrated as comprising a normally open start switch 122 and a normally closed stop switch 124. Leads 126 and 128 are provided from any suitable source of power, such as one phase of the AC supply to the input terminals 2, 4 and 6. One of the contacts of the start button 122 is connected to line 128 and the other contact thereof is connected to point 130. A full wave rectifier 132 in series with resistor 134 is connected between point 130 and line 126. The output from the rectifier 132 feeds electromagnet winding 136 which, when energized, closes the normally open output switch 24, as schematically indicated in FIG. 2 by the broken line 138. A second full wave rectifier 140 is connected in series with resistor 142 and normally closed stop switch 124 between line 126 and point 130. It feeds electromagnet winding 144, which, as indicated by the broken line 147 in FIG. 2, is in turn operatively connected to the normally closed switches 44A, 46A, 48A and 120 of FIG. 1 and to normally open switch 146 of FIG. 2, the latter being connected between lines 128 and 130 in shunt with the start switch 122. A capacitor 148 may be connected across the winding 144. As has been indicated above, the winding 144 may constitute the electromagnetic coil of a dashpot-damped sequential switch, a typical embodiment of which is disclosed in Cohen Patent 2,650,957, the switches 44A, 46A, 48A and 120 and 146 being constituted by different pairs of contacts on such a switch which are adapted to be opened and closed in predetermined sequence as the electromagnetic winding 144 is energized or de-energized. The movable armature of the electromagnetically actuated sequential switch is damped sufficiently for there to be an appreciable time delay between energization of the winding 144 and the actuation of the first switch controlled thereby, that time delay being sufficient to compensate for the time delay between the energization of the winding 136 and the closing of the output switch 24 actuated thereby. Moreover, the sequence of switch actuation upon de-energization of the winding 144 is such that the switch 146 is opened after the switches 44A, 46A and 48A and 120 are opened. Moreover, upon energization of the winding 144 it is preferred that the switches 44A, 46A and 48A be opened before switch 120 is opened.

The operation of the system of the present invention is as follows: With the system at rest, as shown in the drawings, the windings 136 and 144 are de-energized. Consequently the output switch 24 is open, the switches 44A, 46A, 48A and 120 are closed and the switch 146 is open. Because switch 120 is closed the reference voltage applied to the right hand end of the serially connected control windings 50c–54c is substantially zero and hence the current through those windings is such as to prevent the control electrodes 26′-30′ of the controlled rectifiers 26–30 from being energized. The fact that the switches 44A, 46A and 48A are closed positively prevents energization of the control electrodes 26′–30′ even when spikes or transients are active thereon. Thus the voltage and current output to the output switch 24 is zero.

When it is desired to have an output voltage across the output terminals 8 and 10 or, in connection with the specifically disclosed embodiment, when it is desired to start the motor M, the start button 122 is closed. This completes a circuit between the AC-energized lines 126 and 128 through both of the rectifiers 132 and 140, thus energizing the windings 136 and 144. Although the winding 144 is energized substantially simultaneously with the closing of the start switch 122, the fact that its action on its controlled switches is time-delayed, as through dashpot-damping of its movable armature in the sequential of Patent 2,650,957, the energization of the winding 136 affects closing of the outputs switch 24 before the winding 144 operatively acts upon the switches controlled thereby. Hence, the output switch 24 closes while the system output is still zero, and no arcing occurs. Thereafter the winding 144 opens switches 120, 44A, 46A and 48A, thus restoring the regulation system of the power supply to its operative condition, and closes switch 146, thus providing a holding circuit across the start button 122 so as to retain the system in closed full output condition even after the start button 122 has been released and reverts to its open condition.

It is preferred, particularly when the load connected across the output terminals 8 and 10 is initially very low, that the switches 44A, 46A and 48A be opened before the switch 120 is opened. The opening of the switches 44A–48A removes the short circuiting of the control electrodes 26′–30′ and thus conditions the controlled rectifiers 26–30 to fire if and when they are properly biased and their control electrodes 26′–30′ are properly biased. However, for so long as the switch 120 remains closed the regulation system will be such as to produce zero output or a very small output. When the switch 120 is opened the reference voltage will gradually restore itself to nominal value, the time involved being dependent upon capacitor 116, and thus the output of the system will gradually build up, thus restricting the periods of conductivity of the controlled rectifiers 26–30 while the armature 12 of the motor M comes up to speed. In this way overloading of the controlled rectifiers 26–30 which might result from unrestricted feeding into a very low load such as is presented by the motor M when its armature 12 is stationary or rotating only slowly is prevented.

When the output switch 24 is to be opened the stop button 124 is depressed. This opens the circuit to the rectifier 140 and the winding 144, de-energizing the latter, but the output switch 24 remains energized via the closed switch 146. When the winding 144 is de-energized the switches controlled thereby will, in timed sequence, revert to their normal condition as shown in the drawings. First the switch 120 closes, causing the reference voltage to disappear and conditioning the regulating system to reduced or zero output condition. Next the switches 44A, 46A and 48A close, positively preventing operative energization of the control electrodes 26′–30′ and thus positively ensuring zero output. Thereafter switch 146 is opened. This breaks the circuit to rectifier 132, de-energizes winding 136 and opens switch 24. Since there is already zero output at this time, switch 24 opens without arcing.

It will therefore be seen that through the use of a simple time delay sequential switch, accurate and positive control of the timed relationship between the energization and control of the controlled rectifiers in the power supply and the opening and closing of the output switch from the power supply is reliably coordinated so as not only to open and close that switch during times when no output current is flowing but also to ensure a positive turn-off of the controlled rectifiers and a controlled and gradual turn-on of those controlled rectifiers.

While but a single embodiment of the present invention has been here specifically disclosed, it will be apparent that many variations may be made therein, all within the scope of the invention as defined in the following claims.

I claim:

1. In combination with a power supply having an A.C. input, a D.C. output, rectifying means interposed between said input and said output, output regulating means interposed between said input and said output, said regulating means including means for sensing said output and controlling said regulating means in accordance therewith, and a power switch between said rectifying means and said output and actuatable to closed and open conditions; the improvement which comprises a start-stop control means, and means for actuating said regulating means between a regulation condition and a reduced-output condition, and interlock means active between said control means on the one hand and said power switch and said actuating means on the other hand and effective, when said control means is shifted from stop to start, to cause said power switch to shift from open to closed condition while said regulating means is in its reduced-output condition and thereafter to cause said actuating means to place said regulating means in its regulation condition, and, when said control means is shifted from start to stop condition, effective to cause said actuating means to place said regulating means in its reduced-output condition while said power switch is in its closed condition and thereafter to cause said power switch to shift to open condition, said interlock means comprising first and second windings operatively connected to a power source and active on said power switch and said actuating means respectively, said start-stop control means comprising a normally open start switch connected between said source and said first and second windings, a normally closed stop switch connected between said start switch and said second winding, normally open contacts connected across said start switch, and operating means operatively connected between said second winding and said contacts and effective to close said contacts when said second winding is energized and to open said contacts when said second winding is deenergized.

2. The combination of claim 1, in which said rectifying means comprises a controlled rectifier having a control electrode, and said actuating means for said regulating means comprises shift means connected to said control electrode and effective when actuated in a given sense to inhibit operation of said rectifying means, thereby to place said regulating means in said reduced-output condition, said interlock means being active on said shift means to actuate it to said given sense when said control means is shifted to stop condition.

3. The combination of claim 1, in which said output sensing means comprises a reference voltage means having a normal operating value, an output voltage sensing means, means for comparing said reference voltage with said output voltage and energizing said regulating means to cause said output voltage to conform to said reference voltage, and shift means effective when actuated in a given sense to cause said reference voltage means to assume a predetermined low value less than its normal operating value, thereby to place said regulating means in said reduced-output condition, said interlock means being active on said shift means to actuate it in said given sense when said control means is shifted to said stop condition.

4. The combination of claim 1, in which said rectifying means comprises a controlled rectifier having a control electrode, and said actuating means for said regulating means comprises shift means connected to said control electrode and effective when actuated in a given sense to inhibit operation of said rectifying means, thereby to place said regulating means in said reduced-output condition, said interlock means being active on said shift means to actuate it to said given sense when said control means is shifted to stop condition, and in which said output sensing means comprises a reference voltage means having a normal operating value, an output voltage sensing means, means for comparing said reference voltage with said output voltage and energizing said regulating means to cause said output voltage to conform to said reference voltage, and shift means effective when actuated in a given sense to cause said reference voltage means to assume a predetermined low value less than its normal operating value, thereby to place said regulating means in said reduced-output condition, said interlock means being active on said shift means to actuate it in said given sense when said control means is shifted to said stop condition.

5. The combination of claim 1, in which said second winding comprises that part of said interlock means which is active on said actuating means, and means for causing said contacts to close before said actuating means places said regulating means in its regulation condition when said second winding is energized and causing the opposite sequence when said second winding is deenergized.

6. The combination of claim 5, in which said rectifying means comprises a controlled rectifier having a control electrode, and said actuating means for said regulating means comprises shift means connected to said control electrode and effective when actuated in a given sense to inhibit operation of said rectifying means, thereby to place said regulating means in said reduced-output condition, said interlock means being active on said shift means to actuate it to said given sense when said control means is shifted to stop condition.

7. The combination of claim 5, in which said output sensing means comprises a reference voltage means having a normal operating value, an output voltage sensing means, means for comparing said reference voltage with said output voltage and energizing said regulating means to cause said output voltage to conform to said reference voltage, and shift means effective when actuated in a given sense to cause said reference voltage means to assume a predetermined low value less than its normal operating value, thereby to place said regulating means in said reduced-output condition, said interlock means being active on said shift means to actuate it in said given sense when said control means is shifted to said stop condition.

8. The combination of claim 5, in which said rectifying means comprises a controlled rectifier having a control electrode, and said actuating means for said regulating means comprises shift means connected to said control electrode and effective when actuated in a given sense to inhibit operation of said rectifying means, thereby to pace said regulating means in said reduced-output condition, said interlock means being active on said shift means to actuate it to said given sense when said control means is shifted to stop condition, and in which said output sensing means comprises a reference voltage means having a normal operating value, an output voltage sensing means, means for comparing said reference voltage with said output voltage and energizing said regulating means to cause said output voltage to conform to said reference voltage, and shift means effective when actuated in a given sense to cause said reference voltage means to assume a predetermined low value less than its normal operating value, thereby to place said regulating means in said reduced-output condition, said interlock means being active on said shift means to actuate it in said given sense when said control means is shifted to said stop condition.

9. In combination with a power supply having an input, an output, output regulating means interposed between said input and said output, and a power switch between said regulating means and said output and actuatable to closed and open conditions; the improvement which comprises a start-stop control means, means for actuating said regulating means between a regulation condition and reduced-output condition, and interlock means active between said control means on the one hand and said power switch and said regulating means on the other hand and effective, when said control means is shifted from stop to start, to cause said power switch to be shifted from open to closed condition while said regulating means is in its reduced-output condition and thereafter to cause said actuating means to place said regulating means in its regulation condition, and, when said control means is shifted from start to stop condition, effective to cause said actuating means to place said regulating means in its reduced-output condition while said power switch is in its closed condition and thereafter to cause said power switch to shift to open condition, said interlock means comprising first and second windings operatively connected to a power source and active on said power switch and said actuating means respectively, said start-stop control means comprising a normally open start switch connected between said source and said first and second windings, a normally closed stop switch connected between said start switch and said second winding, normally open contacts connected across said start switch, and operating means operatively connected between said second winding and said contacts and effective to close said contacts when said second winding is energized and to open said contacts when said second winding is deenergized.

10. The combination of claim 9, in which said regulating means comprises an output sensing means, comprising a reference voltage means having a normal operating valve, an output voltage sensing means, means for comparing said reference voltage with said output voltage and energizing said regulating means to cause said output voltage to conform to said reference voltage, and shift means effective when actuated in a given sense to cause said reference voltage means to assume a predetermined low value less than its normal operating value, thereby to place said regulating means in said reduced-output condition, said interlock means being active on said shift means to actuate it in said given sense when said control means is shifted to said stop condition.

11. The combination of claim 9, in which said second winding comprises that part of said interlock means which is active on said actuating means, and means for causing said contacts to close before said actuating means places said regulating means in its regulation condition when said second winding is energized and causing the opposite sequence when said second winding is deenergized.

12. The combination of claim 11, in which said regulating means comprises an output sensing means comprising a reference voltage means having a normal operating value, an output voltage sensing means, means for comparing said reference voltage with said output voltage and energizing said regulating means to cause said output voltage to conform to said reference voltage, and shift means effective when actuated in a given sense to cause said reference voltage means to assume a predetermined low value less than its normal operating value, thereby to place said regulating means in said reduced-output condition, said interlock means being active on said shift means to actuate it in said given sense when said control means is shifted to said stop condition.

References Cited

UNITED STATES PATENTS

| | | | |
|---|---|---|---|
| 3,122,659 | 2/1964 | Krestel et al. | 307—136 |
| 3,330,992 | 7/1967 | Perrins | 317—11.1 |
| 3,350,625 | 10/1967 | Larsen | 321—45 |
| 3,372,288 | 3/1968 | Wigington | 307—136 X |

ROBERT K. SCHAEFER, *Primary Examiner.*

T. B. JOIKE, *Assistant Examiner.*

U.S. Cl. X.R.

321—47; 307—136, 252; 317—11